(12) United States Patent
Zidek et al.

(10) Patent No.: US 12,368,591 B2
(45) Date of Patent: Jul. 22, 2025

(54) BLOCKCHAIN ENHANCED IDENTITY ACCESS MANAGEMENT SYSTEM

(71) Applicant: Saudi Arabian Oil Company, Dhahran (SA)

(72) Inventors: Marek Zidek, Dhahran (SA); Mazen A. Baragaba, Dammam (SA); Muhammad S. Aljuaid, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 696 days.

(21) Appl. No.: 17/654,107

(22) Filed: Mar. 9, 2022

(65) Prior Publication Data
US 2023/0291564 A1    Sep. 14, 2023

(51) Int. Cl.
*H04L 9/32*    (2006.01)
*H04L 9/00*    (2022.01)

(52) U.S. Cl.
CPC .......... *H04L 9/3226* (2013.01); *H04L 9/3239* (2013.01); *H04L 9/50* (2022.05)

(58) Field of Classification Search
CPC ........ H04L 9/3226; H04L 9/3239; H04L 9/50
See application file for complete search history.

(56) References Cited

U.S. PATENT DOCUMENTS

| | | |
|---|---|---|
| 5,864,662 A | 1/1999 | Brownmiller et al. |
| 6,072,777 A | 6/2000 | Bencheck et al. |

(Continued)

FOREIGN PATENT DOCUMENTS

| | | |
|---|---|---|
| EP | 3211831 | 8/2017 |
| GB | 2481422 | 12/2011 |

(Continued)

*Primary Examiner* — Paul E Callahan
(74) *Attorney, Agent, or Firm* — Fish & Richardson P.C.

(57) ABSTRACT

Systems and methods include a computer-implemented method for verifying blockchain transaction. A request is received in a blockchain for a user to use an application. A three-blockchain cluster verification process is performed in response to receiving the request. Verification that the application is authorized is performed using a nodes blockchain cluster in the blockchain based on user-application data pre-verified by at least two administrators and stored in the nodes blockchain cluster. Verification that the user exists and is authorized is performed using a users/objects blockchain cluster in the blockchain different from the nodes blockchain cluster, where the verifying is based on the user-application data pre-verified by the at least two administrators and stored in the users/objects blockchain cluster. Verification that credentials for the user exist is performed using a passwords blockchain cluster in the blockchain different from the nodes blockchain cluster and the users/objects blockchain cluster, where the verifying is based on the user-application data pre-verified by the at least two administrators and stored in the passwords blockchain cluster. Access to the application is granted to the user in response to successfully completing the three-blockchain cluster verification process, including verification using the nodes blockchain cluster, the users/objects blockchain cluster, and the passwords blockchain cluster.

20 Claims, 9 Drawing Sheets

(56) References Cited

U.S. PATENT DOCUMENTS

| | | |
|---|---|---|
| 7,237,138 B2 | 6/2007 | Greenwald et al. |
| 7,428,300 B1 | 9/2008 | Drew |
| 7,600,007 B1 | 10/2009 | Lewis |
| 8,782,225 B2 | 7/2014 | Bali |
| 9,432,865 B1 | 8/2016 | Jadunandan et al. |
| 9,491,764 B1 | 11/2016 | Ross et al. |
| 9,729,414 B1 | 11/2017 | Oliveira et al. |
| 9,992,022 B1 | 6/2018 | Chapman et al. |
| 10,116,539 B1 | 10/2018 | Fuchs et al. |
| 10,045,252 B2 | 11/2018 | Agarwal et al. |
| 10,191,778 B1 | 1/2019 | Yang et al. |
| 10,313,213 B1 | 6/2019 | Aygun |
| 10,567,243 B2 | 2/2020 | Tippenhauer et al. |
| 10,601,684 B2 | 3/2020 | Hasmi et al. |
| 10,644,979 B2 | 3/2020 | Samadi |
| 10,680,889 B2 | 6/2020 | Vasseur et al. |
| 10,764,142 B2 | 9/2020 | Bertsche et al. |
| 11,316,700 B1* | 4/2022 | Michaelis ............ H04L 63/0428 |
| 11,689,918 B2* | 6/2023 | Sethi .................... H04W 12/041 |
| | | 726/6 |
| 2001/0039577 A1 | 11/2001 | Barkai et al. |
| 2003/0126254 A1 | 7/2003 | Cruickshank, III et al. |
| 2003/0145081 A1 | 7/2003 | Lau |
| 2003/0225549 A1 | 12/2003 | Shay et al. |
| 2004/0064760 A1 | 4/2004 | Hicks et al. |
| 2004/0103181 A1 | 5/2004 | Chambliss |
| 2006/0056389 A1 | 3/2006 | Monk |
| 2006/0182034 A1 | 8/2006 | Klinker et al. |
| 2006/0215564 A1 | 9/2006 | Breitgand et al. |
| 2006/0221876 A1 | 10/2006 | Kosanovic et al. |
| 2006/0276995 A1 | 12/2006 | Breitgand et al. |
| 2006/0293777 A1 | 12/2006 | Breitgand et al. |
| 2008/0016412 A1 | 1/2008 | White et al. |
| 2008/0027961 A1 | 1/2008 | Arlitt et al. |
| 2008/0049753 A1 | 2/2008 | Heinze et al. |
| 2009/0059895 A1 | 3/2009 | Yasrebi |
| 2009/0089438 A1 | 4/2009 | Agarwal et al. |
| 2009/0181665 A1 | 7/2009 | Sater et al. |
| 2010/0088410 A1 | 4/2010 | Ridley |
| 2010/0103822 A1 | 4/2010 | Montwill |
| 2010/0211673 A1 | 8/2010 | Kosbab et al. |
| 2011/0129071 A1 | 6/2011 | Blackburn et al. |
| 2011/0295942 A1 | 12/2011 | Raghunath et al. |
| 2012/0163386 A1 | 6/2012 | Wang |
| 2013/0021933 A1 | 1/2013 | Kovvali et al. |
| 2013/0107715 A1 | 5/2013 | Szabo et al. |
| 2013/0242775 A1 | 9/2013 | Taylor |
| 2013/0304842 A1 | 11/2013 | Zachariassen et al. |
| 2014/0189097 A1 | 7/2014 | Sidi |
| 2014/0192668 A1 | 7/2014 | Yamany et al. |
| 2015/0089054 A1 | 3/2015 | Rizzi et al. |
| 2015/0128056 A1 | 5/2015 | Rizzi et al. |
| 2015/0138989 A1 | 5/2015 | Polehn |
| 2015/0149631 A1 | 5/2015 | Lissack |
| 2016/0155076 A1 | 6/2016 | Fix et al. |
| 2016/0162346 A1 | 6/2016 | Kushnir et al. |
| 2016/0360361 A1 | 12/2016 | Ross et al. |
| 2017/0046243 A1 | 2/2017 | Shinde |
| 2017/0111807 A1 | 4/2017 | Townend et al. |
| 2017/0126475 A1 | 5/2017 | Mahkonen et al. |
| 2017/0237851 A1 | 8/2017 | Hassan et al. |
| 2017/0250880 A1 | 8/2017 | Akens et al. |
| 2017/0279703 A1 | 9/2017 | Wasmundt et al. |
| 2017/0302505 A1 | 10/2017 | Zafer et al. |
| 2017/0302553 A1 | 10/2017 | Zafer et al. |
| 2017/0353991 A1 | 12/2017 | Tapia et al. |
| 2017/0359272 A1 | 12/2017 | Srinivasan et al. |
| 2018/0024867 A1 | 1/2018 | Gilsdorf et al. |
| 2018/0054772 A1 | 2/2018 | Tan et al. |
| 2018/0109564 A1 | 4/2018 | Rahman |
| 2018/0167446 A1 | 6/2018 | Lewis et al. |
| 2018/0176095 A1 | 6/2018 | Diwakar |
| 2018/0262414 A1 | 9/2018 | Burbridge |
| 2018/0270126 A1 | 9/2018 | Tapia |
| 2018/0343192 A1 | 11/2018 | Antonyraj et al. |
| 2019/0036772 A1 | 1/2019 | Agerstam et al. |
| 2019/0052518 A1 | 2/2019 | Gal et al. |
| 2019/0082286 A1 | 3/2019 | Tata et al. |
| 2019/0141113 A1 | 5/2019 | Ganapathi et al. |
| 2019/0141543 A1 | 5/2019 | Ganapathi et al. |
| 2019/0200243 A1 | 6/2019 | Anand et al. |
| 2019/0205153 A1 | 7/2019 | Niestemski et al. |
| 2019/0213514 A1 | 7/2019 | Gonzalez et al. |
| 2019/0280950 A1 | 9/2019 | Alshafei et al. |
| 2019/0289013 A1 | 9/2019 | Makmel et al. |
| 2019/0319868 A1 | 10/2019 | Svennering et al. |
| 2019/0356535 A1 | 11/2019 | Li et al. |
| 2019/0363960 A1 | 11/2019 | Fuchs et al. |
| 2020/0028782 A1 | 1/2020 | Li et al. |
| 2020/0029240 A1 | 1/2020 | Li et al. |
| 2020/0106602 A1 | 4/2020 | Santos et al. |
| 2020/0106610 A1* | 4/2020 | Doddavula ............ H04L 9/0637 |
| 2020/0125738 A1* | 4/2020 | Mahatwo ................ H04L 63/20 |
| 2021/0342471 A1* | 11/2021 | Larsen ................ G06F 21/6245 |
| 2021/0344507 A1* | 11/2021 | Peng .................... H04L 9/3247 |
| 2022/0045849 A1* | 2/2022 | Jing ........................ H04L 9/088 |

FOREIGN PATENT DOCUMENTS

| | | |
|---|---|---|
| TW | 201812674 A | 7/2017 |
| WO | WO 2017072614 | 5/2017 |

* cited by examiner

US 12,368,591 B2

BLOCKCHAIN ENHANCED IDENTITY ACCESS MANAGEMENT SYSTEM

TECHNICAL FIELD

The present disclosure applies to enhancing security using a multi-blockchain cluster verification process.

BACKGROUND

Identity access management in conventional systems is typically based on a single source of data records. When a user's identity is to be checked, data records are examined in order for data validation to occur. If data in the data records becomes compromised, unauthorized users can gain unauthorized access to information that should be protected by blockchain security.

SUMMARY

The present disclosure describes techniques that can be used for enhancing security of identity access management using a multi-blockchain cluster verification process. In some implementations, a computer-implemented method includes the following. Systems and methods include a computer-implemented method for verifying blockchain transaction. A request is received in a blockchain for a user to use an application. A three-blockchain cluster verification process is performed in response to receiving the request. Verification that the application is authorized is performed using a nodes blockchain cluster in the blockchain based on user-application data pre-verified by at least two administrators and stored in the nodes blockchain cluster. Verification that the user exists and is authorized is performed using a users/objects blockchain cluster in the blockchain different from the nodes blockchain cluster, where the verifying is based on the user-application data pre-verified by the at least two administrators and stored in the users/objects blockchain cluster. Verification that credentials for the user exist is performed using a passwords blockchain cluster in the blockchain different from the nodes blockchain cluster and the users/objects blockchain cluster, where the verifying is based on the user-application data pre-verified by the at least two administrators and stored in the passwords blockchain cluster. Access to the application is granted to the user in response to successfully completing the three-blockchain cluster verification process, including verification using the nodes blockchain cluster, the users/objects blockchain cluster, and the passwords blockchain cluster.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Security of identity management can be enhanced using three blockchain clusters. Virtual links can be introduced between cluster nodes, as is displayed in FIG. 2.

The details of one or more implementations of the subject matter of this specification are set forth in the Detailed Description, the accompanying drawings, and the claims.

Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for enhancing security of identity access management in blockchains. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features. Techniques of the present disclosure can also be used to enhancing security in non-blockchain systems, e.g., by converting these systems to be blockchain-based systems and then using three-cluster-based identity management.

The current disclosure describes techniques for enhancing security in identity access management systems used within blockchain technology. In some implementations, a data layer of the blockchain system can integrate information from multiple blockchain clusters to ensure data integrity and enhance data confidentiality. Using multiple clusters can significantly reduce the likelihood of unauthorized access by implementing two layers of enhancements over conventional systems. Validation of the node, user and password can be performed over three different data clusters. Each cluster can be built by a set of blockchain nodes. Using three clusters in this way, for an unauthorized person to obtain access, the unauthorized person needs to compromise three clusters at the same time. Moreover, the unauthorized person needs to compromise the majority of the nodes in each cluster, which is difficult and unlikely to occur in the blockchain.

Figure 1:
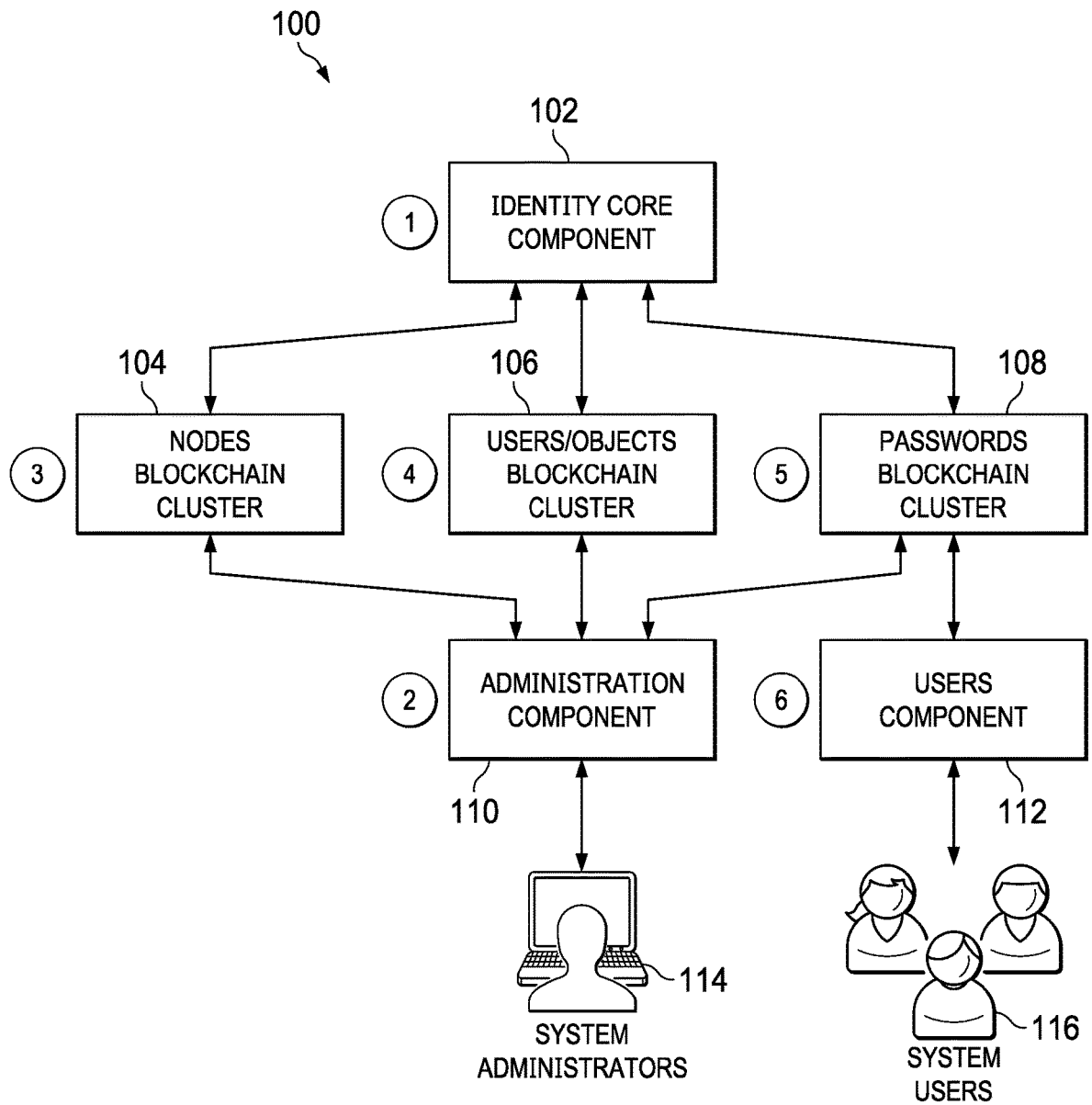
FIG. 1 is a block diagram showing an example architecture of a system for enhancing security of identity access management in blockchains, according to some implementations of the present disclosure.

FIG. 1 is a block diagram showing an example architecture of a system 100 for enhancing security of identity access management in blockchains, according to some implementations of the present disclosure. The system 100 includes an identity core component (ICC) 102, which can provide identity capabilities for the system 100 and can support well-known user repository protocols, such as Lightweight Directory Access Protocol (LDAP), Radius, Terminal Access Controller Access Control System (TACACS). An administration component 110 can manage data objects in the system 100, including blockchain clusters 104, 106, and 108. The administration component 110 can serve as a front end and/or support other functions for system administrators 114.

Each of the blockchain clusters 104, 106, and 108 host different sets of the data. The nodes blockchain clusters 104 contain data defining which system is allowed to communicate with another system. The users/object blockchain cluster 106 contains users' objects. The passwords blockchain cluster 108 contains passwords related to system users 116. A users component 112 provides resources for managing system user accounts and passwords.

Identity Core Component

The ICC 102 can serve as a northbound interface 103 to interact with third-party applications 105 and the system 100. The system 100 can act as an application firewall on which the configuration resides on a blockchain cluster and identity system. Objects and passwords can be stored in other individual blockchain clusters.

Blockchain clusters can act as independent systems, with no relationship existing between records in each cluster. However, an optional feature can be enabled to link records between blockchain clusters. For example, a record in a node validation cluster (e.g., nodes blockchain cluster 104) can include a hash link to a record in an identity validation cluster. Also, a record in the identity validation cluster can include a hash link to a record in a password validation cluster.

Figure 2:
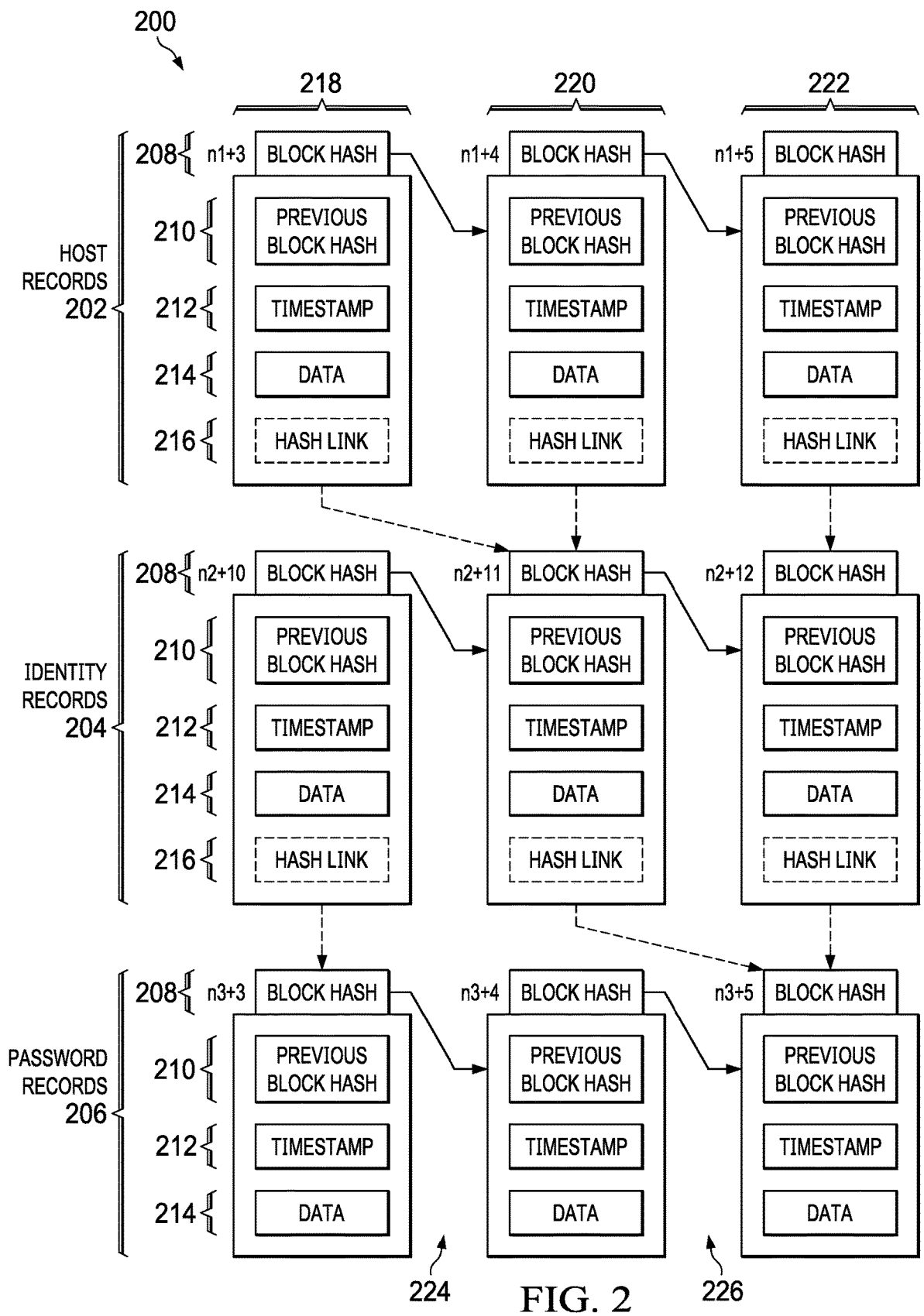
FIG. 2 shows an example of a linkage abstract diagram, according to some implementations of the present disclosure.
Figure 3:
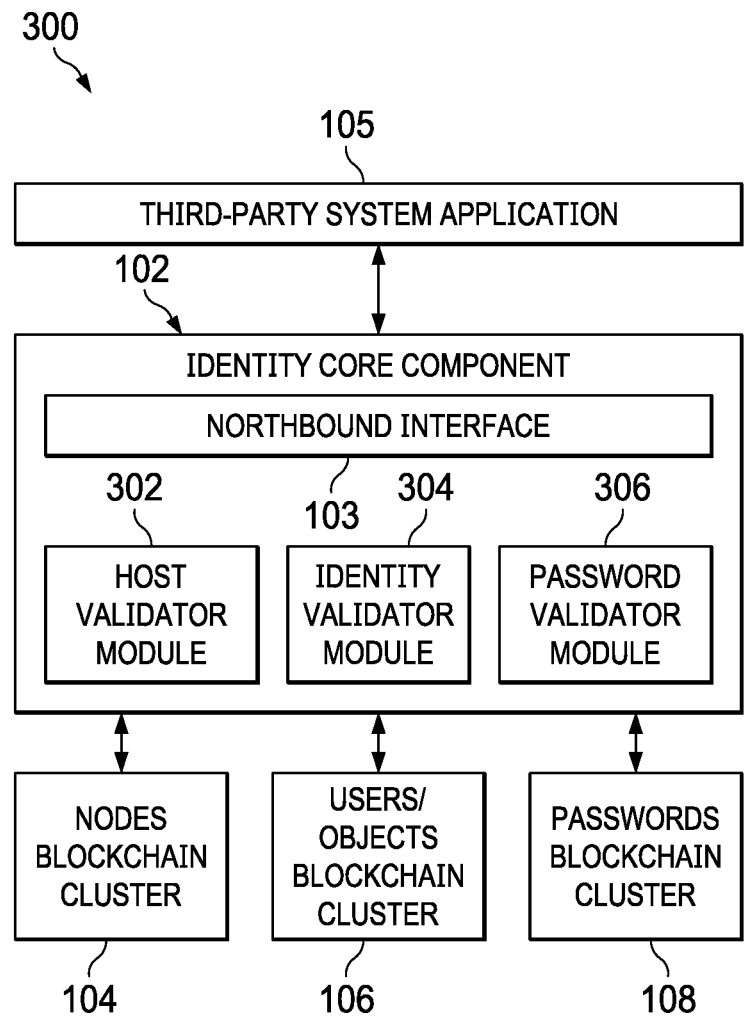
FIG. 3 is a block diagram showing an example a system including the Identity Core Component 102 details, according to some implementations of the present disclosure.

FIG. 2 shows an example of a linkage abstract diagram 200, according to some implementations of the present disclosure. The linkage abstract diagram 200 includes host records 202, identity records 204, and password records 206 that can be used in the ICC 102. An example architecture of the ICC 102 is depicted in FIG. 3 showing an interface and three modules.

Block hashes 208 are security checksums of the data content inside the block. The security checksum is calculated every time after a block is finalized and stored into the blockchain. Block hashes play an important role to secure the blockchain.

Previous block hashes 210 are reference values of the security checksum of the previous block in the blockchain. Timestamps 212 are data blocks which contain date information about when the block was finalized and stored in the blockchain. Data 214 includes main data information related to the system.

Hash links 216 are virtual links between blockchains. This is an optional feature to improve security of the system. Hash links provide additional security against tampering data or attempts to compromise individual blockchains.

Blocks 218 are records of the blockchain containing system data, a timestamp, a previous block hash, and optionally hash link checksum. Blocks 220 are records of the blockchain containing system data, a timestamp, a previous block hash, and optionally hash link checksum. Blocks 222 are records of the blockchain containing system data, a timestamp, a previous block hash, and optionally hash link checksum.

Arrows 224 represent links between blockchain blocks. A calculated checksum of the block 218 is stored in the block 220. Arrows 226 represent links between blockchain blocks. A calculated checksum of the block 220 is stored in the block 222.

FIG. 3 is a block diagram showing an example a system 300 including the Identity Core Component 102 details, according to some implementations of the present disclosure. The architecture of the ICC 102 includes interfaces to the third-party applications 105 and the clusters 104, 106, 108. In some implementations, the ICC 102 can be implemented using modules including a Host Validator Module 302, an Identity Validator Module 304, and a Password Validator Module 306.

Host Validator Module (HVM)

The HVM 302 can use host records 202 to provide application firewall functionality, e.g., standing in Network Layer 4, as an initial check if the application/system can communicate with systems in general. For example, when systems and applications establish communications with the ICC 102, network requests can be forwarded to the HVM 302 for verification. The HVM 302 can be responsible for verifying object in nodes blockchain cluster (NBC) 104, for example. The HVM 302 can obtain validation from a majority of NBC nodes to ensure data integrity.

Identity Validator Module (IVM)

The IVM 304 can provide identity validation for the system 300. Validation can be performed using the identity records 204. IVM provides initial security check if integrated system is authorized to communicate with identify management. IVM has similar functionality as application firewall, but with benefits using blockchain.

Password Validator Module (PVM)

The PVM 306 can receive validation messages and password data from the IVM 304 to initiate password validation processes. The PVM 306 can also identity whether a unique identification hash (IUIH) is enabled. Password data and IUIH can be validated in the Passwords blockchain cluster (PBC).

Nodes Blockchain Cluster

The nodes blockchain cluster (NBD) 104 can include a set of at least three blockchain databases containing data for the HVM 302. Every node in the cluster can include the same copy of the blockchain database and hold list of all active nodes. Internal processes can verify the consistency of the blockchain database, and can check validity of the data against other nodes in the cluster. Unless both verification processes finish successfully, a node is automatically kicked out from the cluster, and other nodes can automatically update a node list. Data objects stored in the NBD 104 can include an application identification, an internet protocol (IP) address of the system or application, and a destination port of the provided service (e.g., LDAP, Radius, or TACACS).

Users/Objects Blockchain Clusters

Users/objects blockchain clusters can be implemented as a set of at least three object blockchain databases (OBDs) containing data for use by the IVM 304, for example. Every node in the cluster can include a same copy of the blockchain database and hold a list of all active nodes. Internal processes can verify the consistency of the blockchain database and check the validity of the data against other nodes in the cluster. Unless both verification processes finish successfully, a node is automatically kicked out from the cluster, and other nodes can automatically update a node list. Data objects stored in OBD can include, for example, an application identification (ID) and a user object.

Passwords Blockchain Cluster

A passwords blockchain cluster can be implemented as a set of at least three password blockchain databases (PBDs) containing data for use by the IVM 304. Every node in the cluster can include a same copy of the blockchain database and hold a list of all active nodes. Internal processes can verify the consistency of the blockchain database and check the validity of the data against other nodes in the cluster. Unless both verification processes finish successfully, a node is automatically kicked out from the cluster, and other nodes can automatically update a node list. Each data object stored in OBD can include an application identification (ID) and a password object.

Administration Component (AC)

An administration component can be used to manage and configure host, identity and password records in blockchain clusters. Creation of a new identity can require two administrators to validate data entry. Once a new data entry is validated by the two administrators, the new identity is created in host, identity, and password clusters.

User Component (UC)

A user component can serve as an interface for system users to manage their password objects in the system. System users can be required to change their password periodically to ensure high security protection. System users can be challenged with two-factor authentication before the system enables capability to manage the password object. The system can utilize voice recognition or a secure token as parts of the two-factor mechanism.

Figure 4:
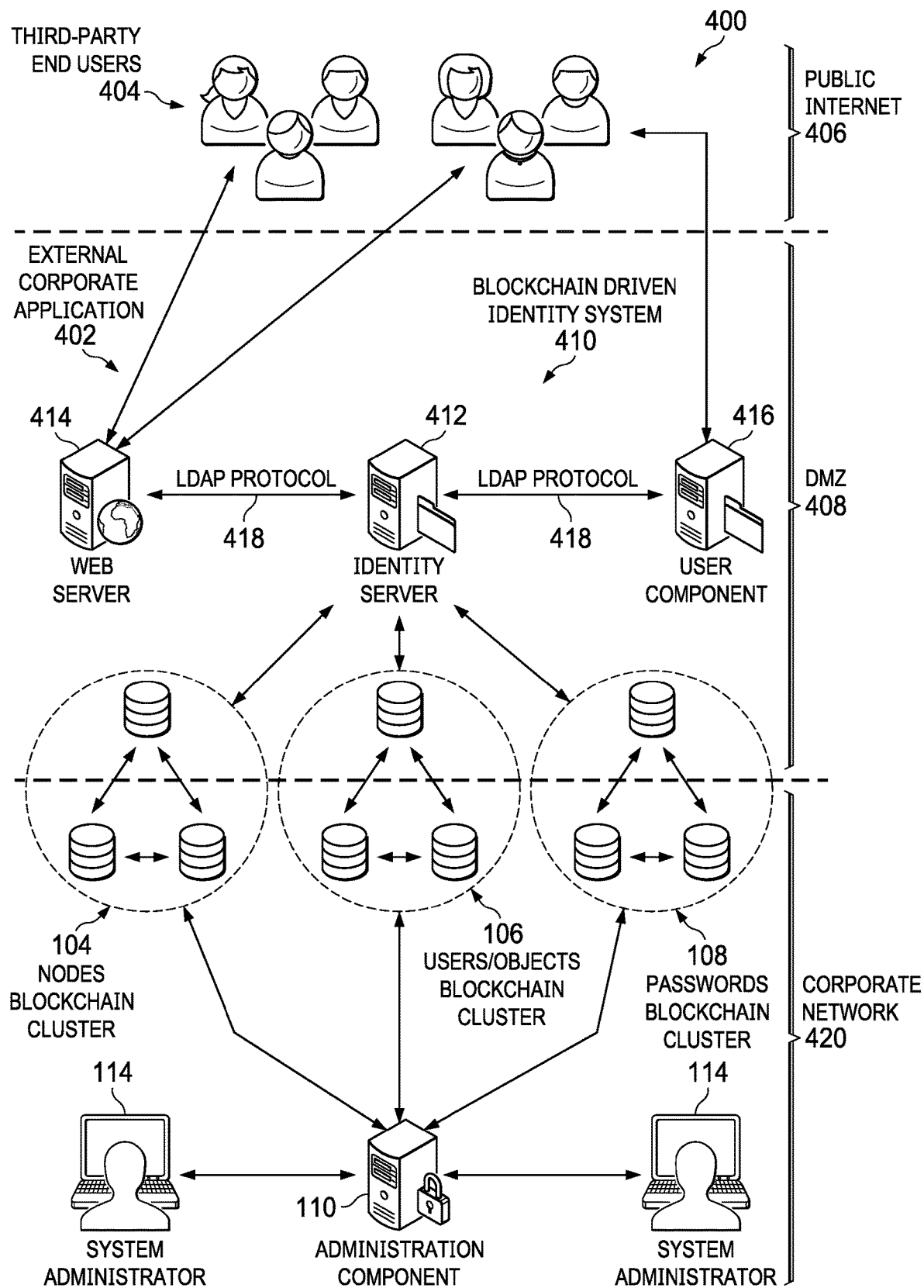
FIG. 4 is a block diagram showing an example of an implementation of the system in a corporate environment with an external exposure to the Internet, according to some implementations of the present disclosure.

Example Use Case of an Implementation of the Present Disclosure in an Enterprise Environment for External/Internet-Facing Services FIG. 4 is a block diagram showing an example of an implementation 400 of the system in a corporate environment with an external exposure to the Internet, according to some implementations of the present disclosure. An external corporate application 402 can be an application which requires user identity identification to operate, such as authorization and authentication of third-party end users 404 (e.g., in a public Internet 406). The external corporate application 402 can operate in a demilitarized zone (DMZ) 408 providing a blockchain-driven identity system 410 that includes an identity server 412 in communication with a web server 414 and a user component 416 using LDAP protocols 418. In this way, the blockchain-driven identity system 410 provides an integration interface to communicate with a system infrastructure.

Blockchain clusters 104, 106, and 108 can be deployed in the DMZ 408 and a corporate network 420. A majority of the nodes of the blockchain clusters can reside in corporate network 420 to ensure data consistency and protect data from unauthorized tampering in case of data breach from an external access or source.

Figure 5:
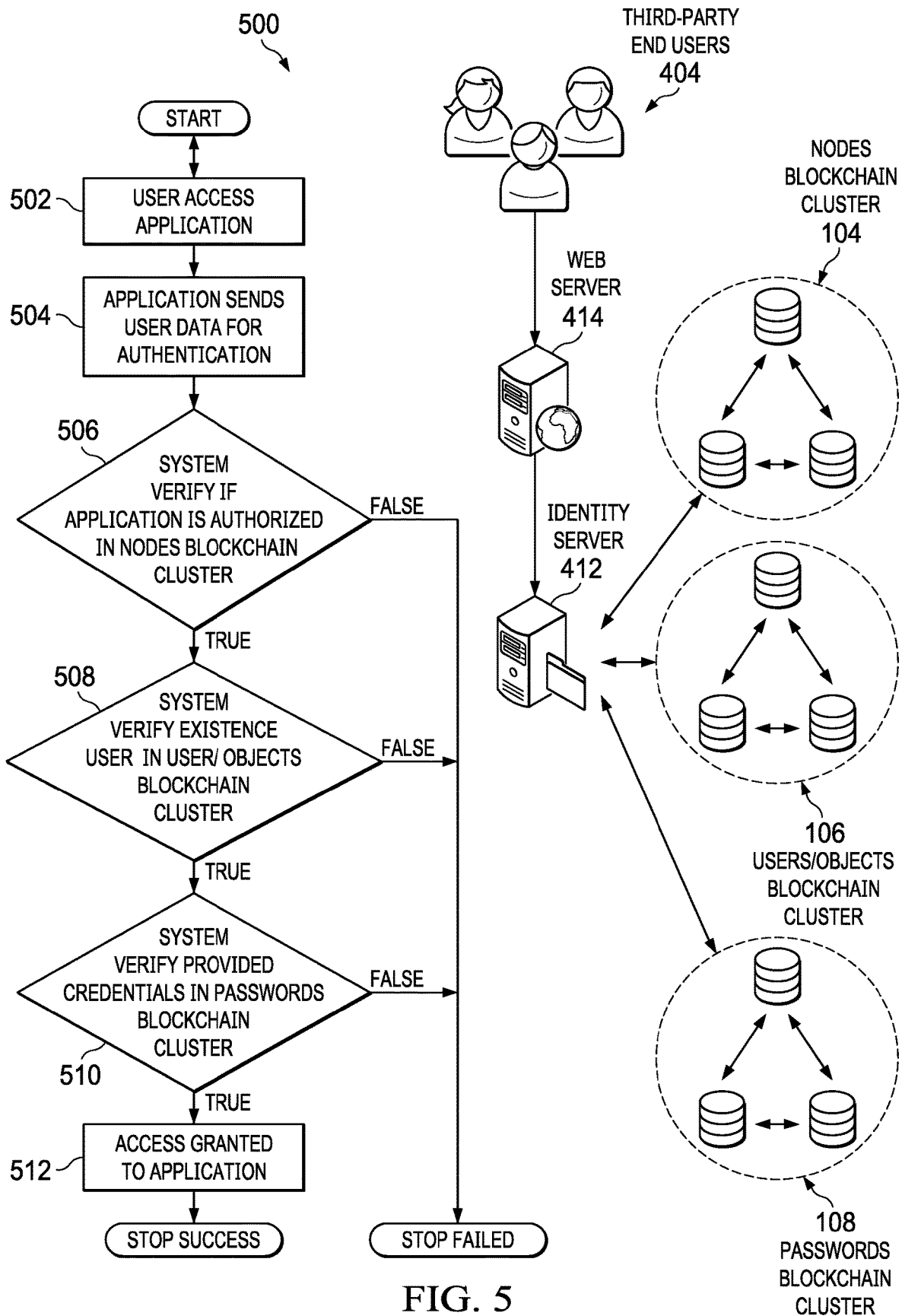
FIG. 5 is a block diagram showing an example of a workflow for accessing an application integrated with a blockchain-driven identity system, according to some implementations of the present disclosure.

FIG. 5 is a block diagram showing an example of a workflow 500 for accessing an application integrated with a blockchain-driven identity system, according to some implementations of the present disclosure. At 502, a user (e.g., a third-party end user 404) accesses an application. At 504, the application sends user data for authentication, e.g., using the web server 414. At 506, the system verifies whether the application is authorized, e.g., in a nodes blockchain cluster 104. At 508, if the application is authorized, the system verifies existence of the user in a users/objects blockchain cluster 106 and verifies the user's authorization to access the application, e.g., using the identity server 412. At 510, if the user exists in the user blockchain, the system verifies credentials provided in a passwords blockchain cluster 108. If the provided credentials exist, then access is granted at 512, indicating success of the three-blockchain cluster verification process.

Figure 6A:
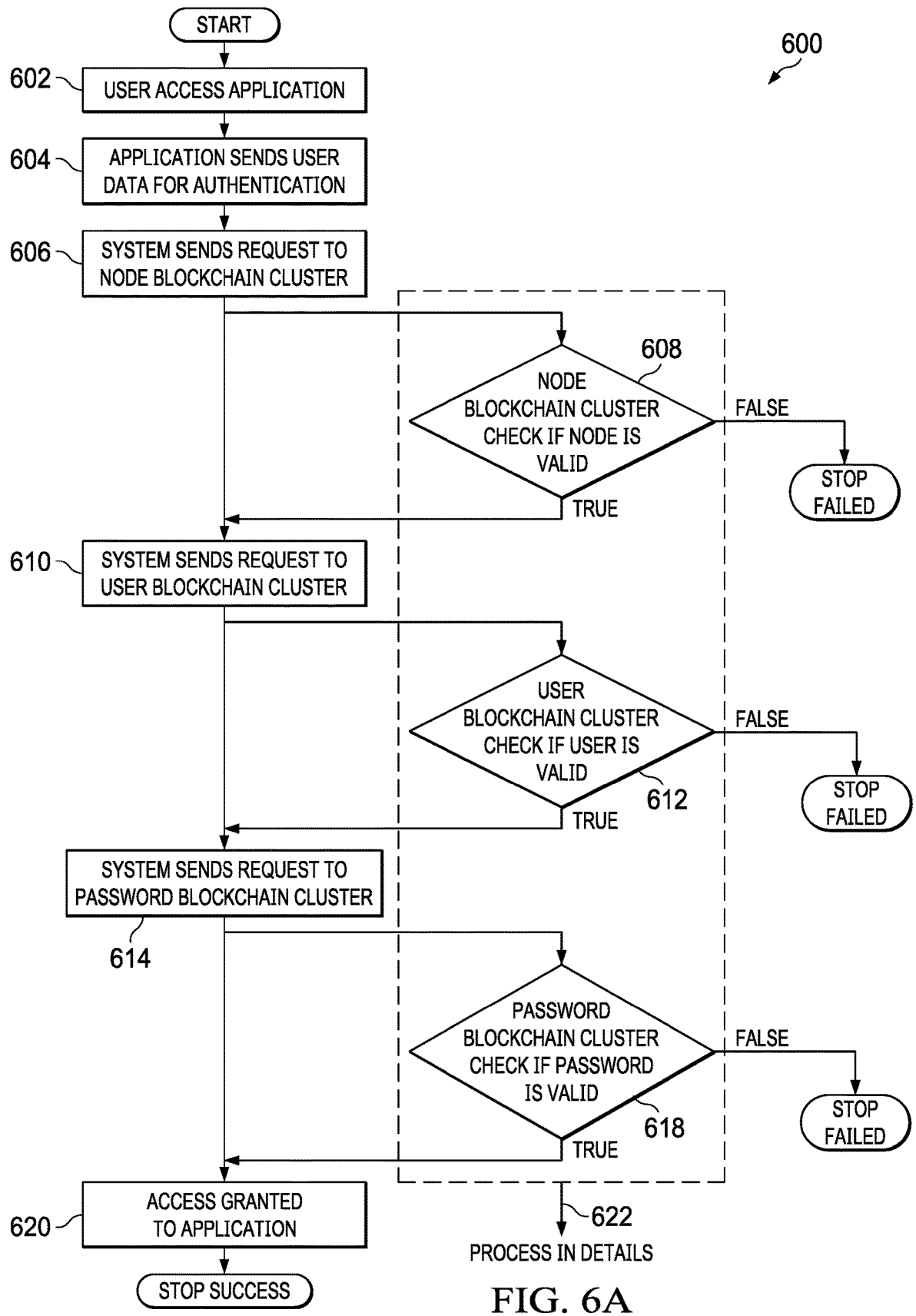
FIGS. 6A and 6B are block diagrams collectively showing an example of a workflow for process communication with blockchain cluster and validation of request and data, according to some implementations of the present disclosure.
Figure 6B:
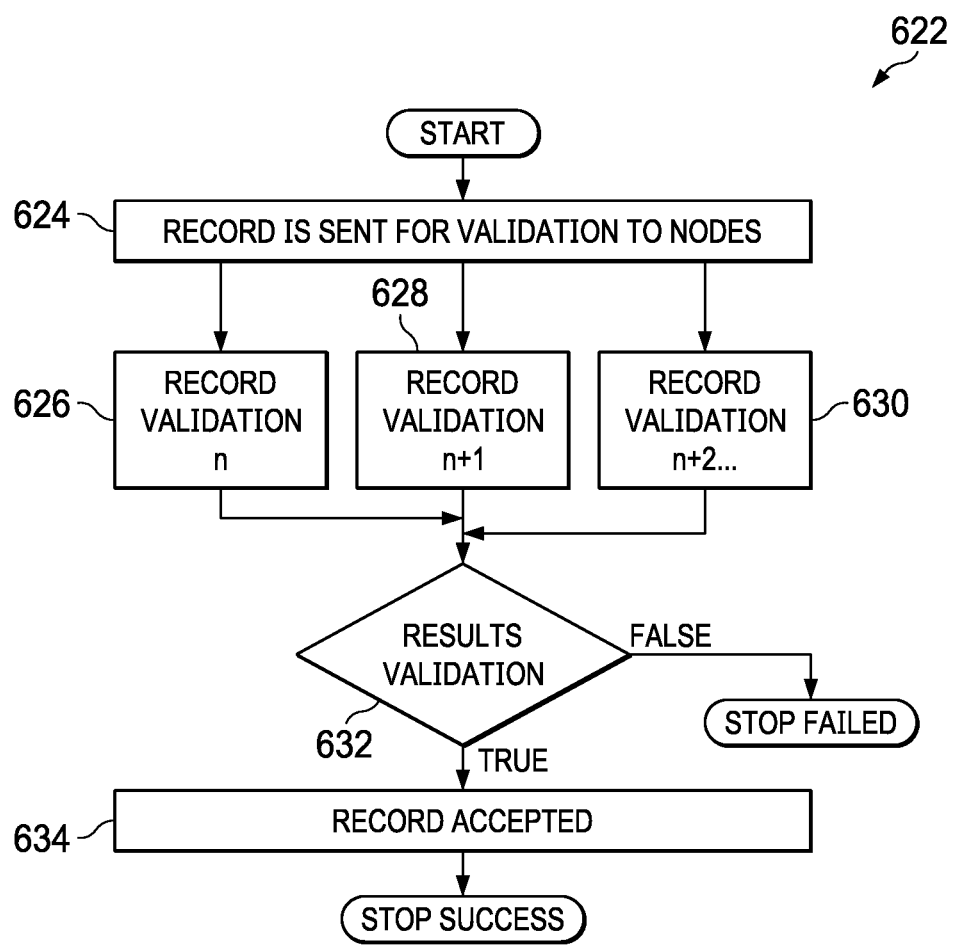

FIGS. 6A and 6B are block diagrams collectively showing an example of a workflow 600 for process communication with blockchain cluster and validation of request and data, according to some implementations of the present disclosure. At 602, a user accesses an application. At 604, the application sends user data for authentication. At 606, the system sends a request to the nodes blockchain cluster. At 608, a determination is made whether the node is valid in the nodes blockchain cluster. If the node is valid, then at 610, the system sends a request to the users/objects blockchain cluster. At 612, a determination is made whether the user is valid in the users/objects blockchain cluster. If the user is valid, then at 614, the system sends a request to the passwords blockchain cluster. At 616, a determination is made whether the password is valid in the passwords blockchain cluster. If the password is valid, then at 620, access is granted to the application. In some implementations of the present disclosure, the three-blockchain cluster verification process (608, 612, and 618) can be processed in parallel. For example, the validation process can stop as soon as one of the parallel verifications indicates a failure output.

In some implementations, checking whether a node, user, or password is valid at 608, 612, or 616, includes detailed processing 622. At 624, a record is sent to three record validations. At 626, a check is made whether the record is valid in an n record, e.g., corresponding to records 218. At 628, a check is made whether the record is valid in an n+1 record, e.g., corresponding to records 220. At 630, a check is made whether the record is valid in an n+2 record, e.g., corresponding to records 222. If one of the checks at 626, 628, or 630 is successful, then at 632, if the results are valid, the record is accepted at 634.

Figure 7:
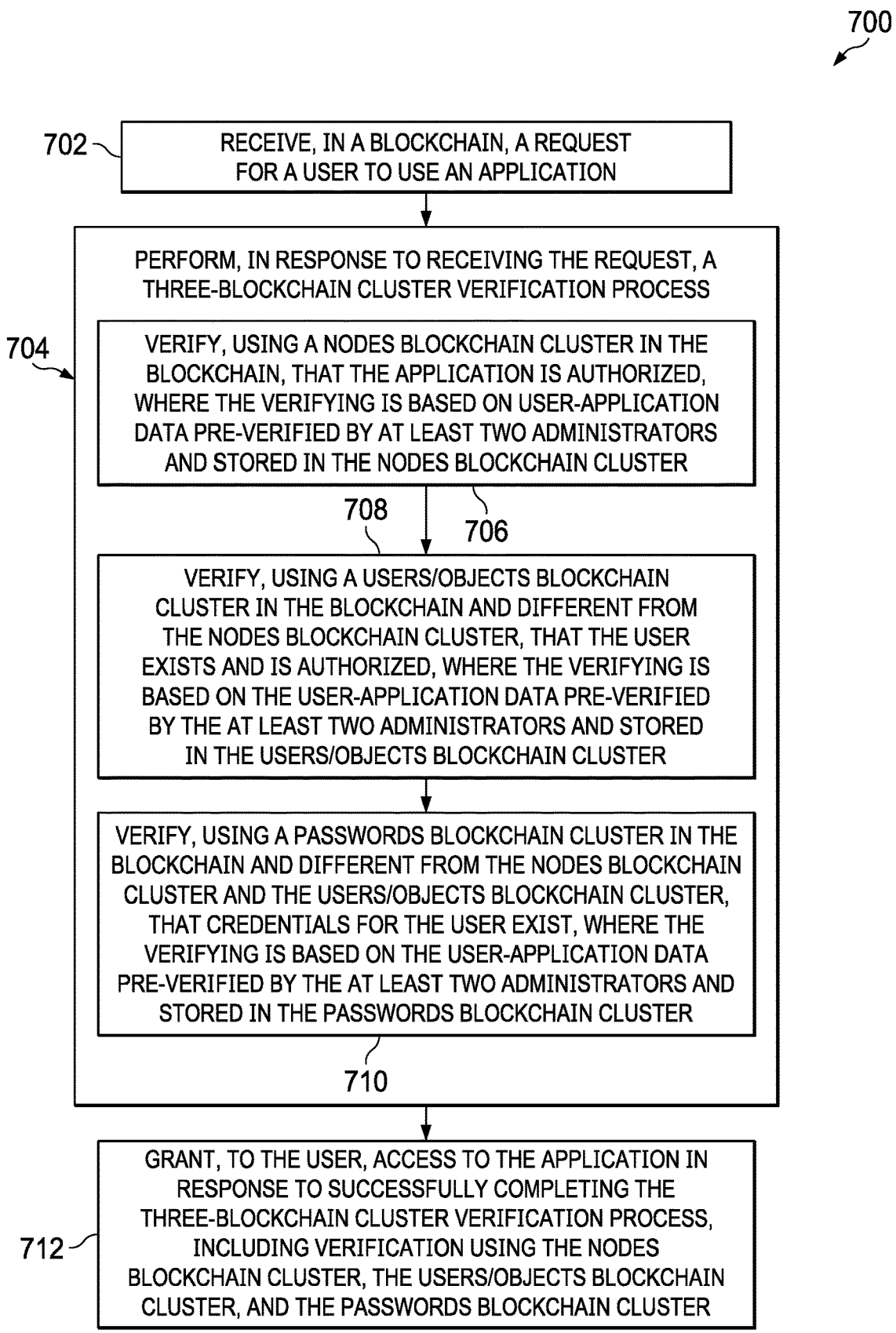
FIG. 7 is a flowchart of an example of a method for performing a three-blockchain cluster verification process to authorize use of an application by a user, according to some implementations of the present disclosure.

FIG. 7 is a flowchart of an example of a method 700 for performing a three-blockchain cluster verification process to authorize use of an application by a user, according to some implementations of the present disclosure. For clarity of presentation, the description that follows generally describes method 700 in the context of the other figures in this description. However, it will be understood that method 700 can be performed, for example, by any suitable system, environment, software, and hardware, or a combination of systems, environments, software, and hardware, as appropriate. In some implementations, various steps of method 700 can be run in parallel, in combination, in loops, or in any order.

At 702, a request is received in a blockchain for a user to use an application. The request can be sent by a third-party system application 105, for example, and received by the ICC 102. From 702, method 700 proceeds to 704.

At 704, a three-blockchain cluster verification process is performed in response to receiving the request. For example, the ICC 102 can perform the verification. In some implementations, the three-blockchain cluster verification process includes steps 706, 708, and 710. In some implementations, performing the three-blockchain cluster verification process can include accessing multiple records in the nodes blockchain cluster, the users/objects blockchain cluster, and the passwords blockchain cluster. The multiple records include n records, n+1 records, and n+2 records, and can be linked with block hashes, as described with reference to FIG. 2.

At 706, verification that the application is authorized is performed using a nodes blockchain cluster in the blockchain based on user-application data pre-verified by at least two administrators and stored in the nodes blockchain cluster. As an example, the host validator module 302 can access host records 202 in the nodes blockchain cluster 104 to determine if the application is authorized in the blockchain. From 706, method 700 proceeds to 708.

At 708, verification that the user exists and is authorized is performed using a users/objects blockchain cluster in the blockchain different from the nodes blockchain cluster, where the verifying is based on the user-application data pre-verified by the at least two administrators and stored in the users/objects blockchain cluster. As an example, the identity validator module 304 can access host records 204 in the users/objects blockchain cluster 106 to determine if the user exists in the blockchain. From 708, method 700 proceeds to 710.

At 710, verification that credentials for the user exist is performed using a passwords blockchain cluster in the blockchain different from the nodes blockchain cluster and the users/objects blockchain cluster, where the verifying is based on the user-application data pre-verified by the at least two administrators and stored in the passwords blockchain cluster. As an example, the password validator module 306 can access password records 206 in the passwords blockchain cluster 108 to determine if user credentials are valid. From 710 (and completion of step 704), method 700 proceeds to 712.

At 712, access to the application is granted to the user in response to successfully completing the three-blockchain cluster verification process, including verification using the nodes blockchain cluster, the users/objects blockchain cluster, and the passwords blockchain cluster. For example, access to the third-party system application 105 can be granted. After 712, method 700 can stop.

In some implementations, method 700 further includes populating the data needed to perform the three-blockchain cluster verification process. For example, as described with reference to FIG. 4, user-application data is received for verification of the user and for verification of the application used by the user. The user-application data is validated using validation received from the at least two administrators. In response to validating the user-application data using validation received from the at least two administrators, at least one host record is generated in the nodes blockchain cluster using the user-application data, at least one identity record is generated in the users/objects blockchain cluster using the user-application data, and at least one password record is generated in the passwords blockchain cluster using the user-application data. A majority of cluster nodes of the nodes blockchain cluster, the users/objects blockchain cluster, and the passwords blockchain cluster can reside in a corporate network, e.g., as shown in FIG. 4. The at least one host record, the at least one identity record, and the at least one password record can be stored on an identity server different from a web server.

Figure 8:
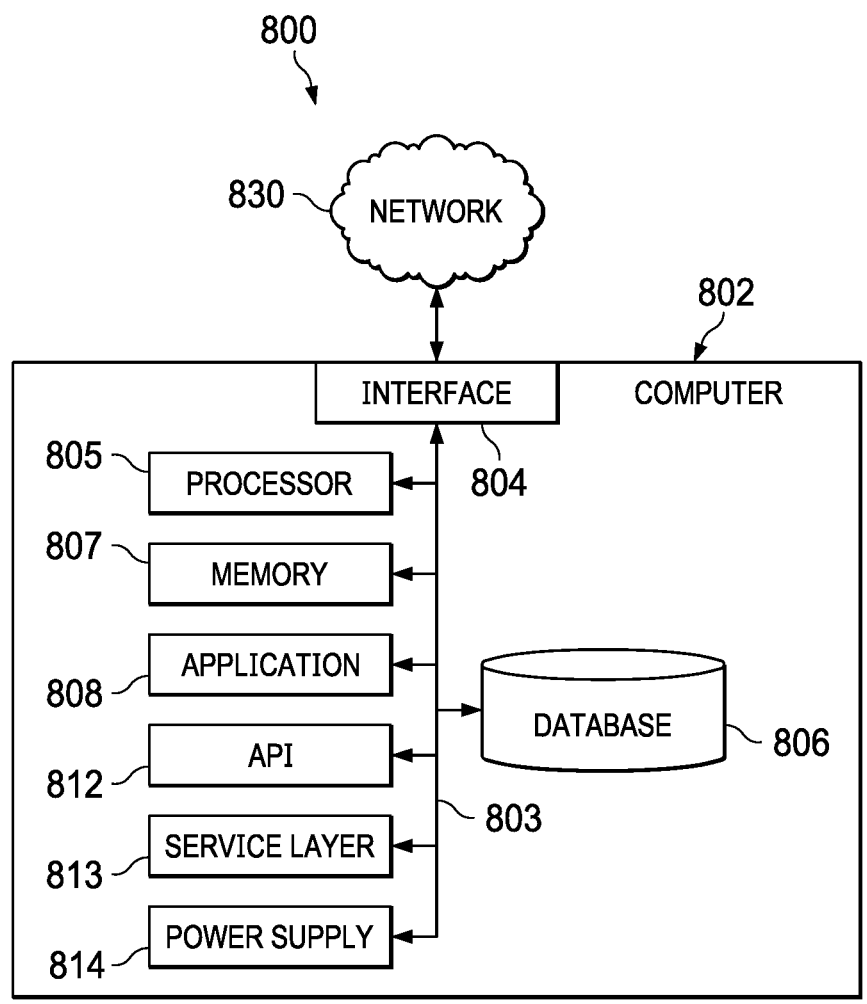
FIG. 8 is a block diagram illustrating an example computer system used to provide computational functionalities associated with described algorithms, methods, functions, processes, flows, and procedures as described in the present disclosure, according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a top level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both) over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Described implementations of the subject matter can include one or more features, alone or in combination.

For example, in a first implementation, a computer-implemented method includes the following. A request is received in a blockchain for a user to use an application. A three-blockchain cluster verification process is performed in response to receiving the request. Verification that the application is authorized is performed using a nodes blockchain cluster in the blockchain based on user-application data pre-verified by at least two administrators and stored in the nodes blockchain cluster. Verification that the user exists and is authorized is performed using a users/objects blockchain cluster in the blockchain different from the nodes blockchain cluster, where the verifying is based on the user-application data pre-verified by the at least two administrators and stored in the users/objects blockchain cluster. Verification that credentials for the user exist is performed using a passwords blockchain cluster in the blockchain different from the nodes blockchain cluster and the users/objects blockchain cluster, where the verifying is based on the user-application data pre-verified by the at least two administrators and stored in the passwords blockchain cluster. Access to the application is granted to the user in response to successfully completing the three-blockchain cluster verification process, including verification using the nodes blockchain cluster, the users/objects blockchain cluster, and the passwords blockchain cluster.

The foregoing and other described implementations can each, optionally, include one or more of the following features:

A first feature, combinable with any of the following features, the method further including: receiving user-application data for verification of the user and for verification of the application used by the user; validating, using validation received from the at least two administrators, the user-application data; and in response to validating the user-application data using validation received from the at least two administrators, generating, using the user-application data: at least one host record in the nodes blockchain cluster, at least one identity record in the users/objects blockchain cluster, and at least one password record in the passwords blockchain cluster.

A second feature, combinable with any of the previous or following features, where a majority of cluster nodes of the nodes blockchain cluster, the users/objects blockchain cluster, and the passwords blockchain cluster reside in a corporate network.

A third feature, combinable with any of the previous or following features, where performing the three-blockchain cluster verification process includes accessing multiple records in the nodes blockchain cluster, the users/objects blockchain cluster, and the passwords blockchain cluster.

A fourth feature, combinable with any of the previous or following features, where the multiple records include n records, n+1 records, and n+2 records.

A fifth feature, combinable with any of the previous or following features, where the multiple records are linked with block hashes.

A sixth feature, combinable with any of the previous or following features, the method further including storing, on an identity server different from a web server, the at least one host record, the at least one identity record, and the at least one password record.

In a second implementation, a non-transitory, computer-readable medium stores one or more instructions executable by a computer system to perform operations including the following. A request is received in a blockchain for a user to use an application. A three-blockchain cluster verification process is performed in response to receiving the request. Verification that the application is authorized is performed using a nodes blockchain cluster in the blockchain based on user-application data pre-verified by at least two administrators and stored in the nodes blockchain cluster. Verification that the user exists and is authorized is performed using a users/objects blockchain cluster in the blockchain different from the nodes blockchain cluster, where the verifying is based on the user-application data pre-verified by the at least two administrators and stored in the users/objects blockchain cluster. Verification that credentials for the user exist is performed using a passwords blockchain cluster in the blockchain different from the nodes blockchain cluster and the users/objects blockchain cluster, where the verifying is based on the user-application data pre-verified by the at least two administrators and stored in the passwords blockchain cluster. Access to the application is granted to the user in response to successfully completing the three-blockchain cluster verification process, including verification using the nodes blockchain cluster, the users/objects blockchain cluster, and the passwords blockchain cluster.

The foregoing and other described implementations can each, optionally, include one or more of the following features:

A first feature, combinable with any of the following features, the operations further including: receiving user-application data for verification of the user and for verification of the application used by the user; validating, using validation received from the at least two administrators, the user-application data; and in response to validating the user-application data using validation received from the at least two administrators, generating, using the user-application data: at least one host record in the nodes blockchain cluster, at least one identity record in the users/objects blockchain cluster, and at least one password record in the passwords blockchain cluster.

A second feature, combinable with any of the previous or following features, where a majority of cluster nodes of the nodes blockchain cluster, the users/objects blockchain cluster, and the passwords blockchain cluster reside in a corporate network.

A third feature, combinable with any of the previous or following features, where performing the three-blockchain cluster verification process includes accessing multiple records in the nodes blockchain cluster, the users/objects blockchain cluster, and the passwords blockchain cluster.

A fourth feature, combinable with any of the previous or following features, where the multiple records include n records, n+1 records, and n+2 records.

A fifth feature, combinable with any of the previous or following features, where the multiple records are linked with block hashes.

A sixth feature, combinable with any of the previous or following features, the operations further including storing, on an identity server different from a web server, the at least one host record, the at least one identity record, and the at least one password record.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A request is received in a blockchain for a user to use an application. A three-blockchain cluster verification process is performed in response to receiving the request. Verification that the application is authorized is performed using a nodes blockchain cluster in the blockchain based on user-application data pre-verified by at least two administrators and stored in the nodes blockchain cluster. Verification that the user exists and is authorized is performed using a users/objects blockchain cluster in the blockchain different from the nodes blockchain cluster, where the verifying is based on the user-application data pre-verified by the at least two administrators and stored in the users/objects blockchain cluster. Verification that credentials for the user exist is performed using a passwords blockchain cluster in the blockchain different from the nodes blockchain cluster and the users/objects blockchain cluster, where the verifying is based on the user-application data pre-verified by the at least two administrators and stored in the passwords blockchain cluster. Access to the application is granted to the user in response to successfully completing the three-blockchain cluster verification process, including verification using the nodes blockchain cluster, the users/objects blockchain cluster, and the passwords blockchain cluster.

The foregoing and other described implementations can each, optionally, include one or more of the following features:

A first feature, combinable with any of the following features, the operations further including: receiving user-application data for verification of the user and for verification of the application used by the user; validating, using validation received from the at least two administrators, the user-application data; and in response to validating the user-application data using validation received from the at least two administrators, generating, using the user-application data: at least one host record in the nodes blockchain cluster, at least one identity record in the users/objects blockchain cluster, and at least one password record in the passwords blockchain cluster.

A second feature, combinable with any of the previous or following features, where a majority of cluster nodes of the nodes blockchain cluster, the users/objects blockchain cluster, and the passwords blockchain cluster reside in a corporate network.

A third feature, combinable with any of the previous or following features, where performing the three-blockchain cluster verification process includes accessing multiple records in the nodes blockchain cluster, the users/objects blockchain cluster, and the passwords blockchain cluster.

A fourth feature, combinable with any of the previous or following features, where the multiple records include n records, n+1 records, and n+2 records.

A fifth feature, combinable with any of the previous or following features, where the multiple records are linked with block hashes.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/nonpermanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   receiving, in a blockchain, a request for a user to use an application, the blockchain comprising a host validator module providing application firewall functionality, blocking unauthorized user devices from accessing the application;
   performing, in response to receiving the request, a three-blockchain cluster verification process, comprising:
      verifying, using a nodes blockchain cluster in the blockchain, that the application is authorized, wherein the verifying is based on user-application data verified by at least two administrators and stored in the nodes blockchain cluster;
      verifying, using an object blockchain cluster in the blockchain and different from the nodes blockchain cluster, that the user exists and is authorized, wherein the verifying is based on the user-application data verified by the at least two administrators and stored in the object blockchain cluster; and
      validating, using a passwords blockchain cluster in the blockchain and different from the nodes blockchain cluster and the object blockchain cluster, over three different blockchain clusters, that credentials for the user exist, wherein the verifying is based on the user-application data verified by the at least two administrators and stored in the passwords blockchain cluster, each node of the nodes blockchain cluster comprising data defining which system is allowed to communicate with another system; and
   granting, to the user, access to the application in response to successfully completing the three-blockchain cluster verification process, comprising verification using the nodes blockchain cluster, the object blockchain cluster, and the passwords blockchain cluster.

2. The computer-implemented method of claim 1, further comprising:
   receiving user-application data for verification of the user and for verification of the application used by the user;
   validating, using validation received from the at least two administrators, the user-application data; and
   in response to validating the user-application data using validation received from the at least two administrators, generating, using the user-application data:
      at least one host record in the nodes blockchain cluster,
      at least one identity record in the object blockchain cluster, and
      at least one password record in the passwords blockchain cluster.

3. The computer-implemented method of claim 2, further comprising storing, on an identity server different from a web server, the at least one host record, the at least one identity record, and the at least one password record.

4. The computer-implemented method of claim 1, wherein a majority of cluster nodes of the nodes blockchain cluster, the object blockchain cluster, and the passwords blockchain cluster reside in a corporate network.

5. The computer-implemented method of claim 1, wherein performing the three-blockchain cluster verification process comprises accessing a plurality of records in the nodes blockchain cluster, the object blockchain cluster, and the passwords blockchain cluster.

6. The computer-implemented method of claim 5, wherein the plurality of records comprise n records, n+1 records, and n+2 records.

7. The computer-implemented method of claim 5, wherein the plurality of records are linked with block hashes.

8. A non-transitory, computer-readable medium storing one or more instructions executable by a computer system to perform operations comprising:
   receiving, in a blockchain, a request for a user to use an application, the blockchain comprising a host validator module providing application firewall functionality, blocking unauthorized user devices from accessing the application;
   performing, in response to receiving the request, a three-blockchain cluster verification process, comprising:
      verifying, using a nodes blockchain cluster in the blockchain, that the application is authorized, wherein the verifying is based on user-application data verified by at least two administrators and stored in the nodes blockchain cluster;
      verifying, using an object blockchain cluster in the blockchain and different from the nodes blockchain cluster, that the user exists and is authorized, wherein the verifying is based on the user-application data verified by the at least two administrators and stored in the object blockchain cluster; and
      validating, using a passwords blockchain cluster in the blockchain and different from the nodes blockchain cluster and the object blockchain cluster, over three different blockchain clusters, that credentials for the user exist, wherein the verifying is based on the user-application data verified by the at least two administrators and stored in the passwords blockchain cluster, each node of the nodes blockchain cluster comprising data defining which system is allowed to communicate with another system; and
   granting, to the user, access to the application in response to successfully completing the three-blockchain cluster verification process, comprising verification using the nodes blockchain cluster, the object blockchain cluster, and the passwords blockchain cluster.

9. The non-transitory, computer-readable medium of claim 8, the operations further comprising:
   receiving user-application data for verification of the user and for verification of the application used by the user;
   validating, using validation received from the at least two administrators, the user-application data; and
   in response to validating the user-application data using validation received from the at least two administrators, generating, using the user-application data:
      at least one host record in the nodes blockchain cluster, at least one identity record in the object blockchain cluster, and at least one password record in the passwords blockchain cluster.

10. The non-transitory, computer-readable medium of claim 9, further comprising storing, on an identity server different from a web server, the at least one host record, the at least one identity record, and the at least one password record.

11. The non-transitory, computer-readable medium of claim 8, wherein a majority of cluster nodes of the nodes blockchain cluster, the object blockchain cluster, and the passwords blockchain cluster reside in a corporate network.

12. The non-transitory, computer-readable medium of claim 8, wherein performing the three-blockchain cluster verification process comprises accessing a plurality of records in the nodes blockchain cluster, the object blockchain cluster, and the passwords blockchain cluster.

13. The non-transitory, computer-readable medium of claim 12, wherein the plurality of records comprise n records, n+1 records, and n+2 records.

14. The non-transitory, computer-readable medium of claim 12, wherein the plurality of records are linked with block hashes.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving, in a blockchain, a request for a user to use an application, the blockchain comprising a host validator module providing application firewall functionality, blocking unauthorized user devices from accessing the application;
performing, in response to receiving the request, a three-blockchain cluster verification process, comprising:
verifying, using a nodes blockchain cluster in the blockchain, that the application is authorized, wherein the verifying is based on user-application data verified by at least two administrators and stored in the nodes blockchain cluster;
verifying, using an object blockchain cluster in the blockchain and different from the nodes blockchain cluster, that the user exists and is authorized, wherein the verifying is based on the user-application data verified by the at least two administrators and stored in the object blockchain cluster; and validating, using a passwords blockchain cluster in the blockchain and different from the nodes blockchain cluster and the object blockchain cluster, over three different blockchain clusters, that credentials for the user exist, wherein the verifying is based on the user-application data verified by the at least two administrators and stored in the passwords blockchain cluster, each node of the nodes blockchain cluster comprising data defining which system is allowed to communicate with another system; and granting, to the user, access to the application in response to successfully completing the three-blockchain cluster verification process, comprising verification using the nodes blockchain cluster, the object blockchain cluster, and the passwords blockchain cluster.

16. The computer-implemented system of claim 15, the operations further comprising:
receiving user-application data for verification of the user and for verification of the application used by the user;
validating, using validation received from the at least two administrators, the user-application data; and
in response to validating the user-application data using validation received from the at least two administrators, generating, using the user-application data:
at least one host record in the nodes blockchain cluster,
at least one identity record in the object blockchain cluster, and
at least one password record in the passwords blockchain cluster.

17. The computer-implemented system of claim 15, wherein a majority of cluster nodes of the nodes blockchain cluster, the object blockchain cluster, and the passwords blockchain cluster reside in a corporate network.

18. The computer-implemented system of claim 15, wherein performing the three-blockchain cluster verification process comprises accessing a plurality of records in the nodes blockchain cluster, the object blockchain cluster, and the passwords blockchain cluster.

19. The computer-implemented system of claim 18, wherein the plurality of records comprise n records, n+1 records, and n+2 records.

20. The computer-implemented system of claim 18, wherein the plurality of records are linked with block hashes.

* * * * *